US011454811B2

(12) United States Patent
Xiao et al.

(10) Patent No.: US 11,454,811 B2
(45) Date of Patent: Sep. 27, 2022

(54) METHOD AND APPARATUS FOR UNLOCKING HEAD-MOUNTED DISPLAY DEVICE

(71) Applicant: Matrixed Reality Technology Co., Ltd., Wuxi (CN)

(72) Inventors: Bing Xiao, Beijing (CN); Chi Xu, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 17/257,196

(22) PCT Filed: Sep. 6, 2019

(86) PCT No.: PCT/CN2019/104766
§ 371 (c)(1),
(2) Date: Dec. 30, 2020

(87) PCT Pub. No.: WO2020/048535
PCT Pub. Date: Mar. 12, 2020

(65) Prior Publication Data
US 2021/0124168 A1 Apr. 29, 2021

(30) Foreign Application Priority Data
Sep. 8, 2018 (CN) .......................... 201811047014.3

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0172* (2013.01); *G06F 3/013* (2013.01);
(Continued)

(58) Field of Classification Search
CPC ...... G02B 2027/0138; G02B 2027/014; G02B 2027/0178; G02B 27/0093; G02B 27/0172; G06F 21/32; G06F 21/36; G06F 3/013
See application file for complete search history.

(56) References Cited

U.S. PATENT DOCUMENTS 8,235,529 B1 * 8/2012 Raffle .................. G02B 27/017
351/209
9,274,599 B1 * 3/2016 D'Amico ................ G06F 3/013
(Continued)

FOREIGN PATENT DOCUMENTS

CN 104636648 A 5/2015
CN 104836900 A 8/2015
(Continued)

*Primary Examiner* — Dmitriy Bolotin
(74) *Attorney, Agent, or Firm* — Preti Flaherty Beliveau & Pachios LLP (57) ABSTRACT

The present disclosure provides a method and apparatus for unlocking a head-mounted display device based on gaze point information. The method includes: acquiring gaze point information of a user who wears a locked head-mounted display device; generating unlocking information according to the gaze point information; performing a matching operation on the unlocking information and a pre-stored unlocking key; and unlocking the head-mounted display device when the unlocking information matches the unlocking key. With this method, convenience and safety of the unlocking operation may be improved, and user's experience may be enhanced.

20 Claims, 8 Drawing Sheets

(51) Int. Cl.
  *G06F 3/01* (2006.01)
  *G06F 21/36* (2013.01)
(52) U.S. Cl.
  CPC ........ *G06F 21/36* (2013.01); *G02B 2027/014* (2013.01); *G02B 2027/0178* (2013.01)

(56) References Cited

U.S. PATENT DOCUMENTS

| | | | |
|---|---|---|---|
| 9,285,874 B2* | 3/2016 | Bychkov | G06F 3/013 |
| 2015/0058649 A1 | 2/2015 | Song et al. | |
| 2015/0084864 A1 | 3/2015 | Geiss et al. | |
| 2015/0139509 A1* | 5/2015 | Yang | G02B 27/017 |
| | | | 382/117 |
| 2015/0220152 A1* | 8/2015 | Tait | G06F 3/017 |
| | | | 345/156 |
| 2015/0234461 A1* | 8/2015 | Suzuki | G06F 21/36 |
| | | | 345/156 |
| 2016/0042172 A1* | 2/2016 | Chiplunkar | G06F 3/017 |
| | | | 726/19 |
| 2016/0316366 A1* | 10/2016 | Takenouchi | G10L 17/22 |
| 2017/0115742 A1* | 4/2017 | Xing | G06F 3/0485 |
| 2017/0132399 A1* | 5/2017 | Pawluk | G06F 3/0304 |
| 2018/0008161 A1* | 1/2018 | Shin | G06F 21/32 |
| 2019/0121949 A1* | 4/2019 | Xu | G06F 21/36 |
| 2020/0089855 A1* | 3/2020 | Chou | H04L 9/32 |
| 2022/0044302 A1* | 2/2022 | Rakshit | G06Q 20/14 |

FOREIGN PATENT DOCUMENTS

| | | |
|---|---|---|
| CN | 106933349 A | 7/2017 |
| CN | 107087431 A | 8/2017 |
| CN | 107169338 A | 9/2017 |
| CN | 107577930 A | 1/2018 |
| CN | 107885987 A | 4/2018 |
| CN | 107944245 A | 4/2018 |
| CN | 109145566 A | 1/2019 |
| WO | 2014/087558 A1 | 6/2014 |

* cited by examiner

METHOD AND APPARATUS FOR UNLOCKING HEAD-MOUNTED DISPLAY DEVICE

CROSS-REFERENCE TO RELATED APPLICATIONS

The present application is a national phase entry under 35 USC § 371 of International Application PCT/CN2019/104766, filed on Sep. 6, 2019, which claims the benefit of and priority to Chinese Patent Application No. 201811047014.3, filed on Sep. 8, 2018, the entire disclosures of which are incorporated herein by reference.

FIELD

The disclosure generally relates to the field of virtual reality technology, and more particularly, to a method and apparatus for unlocking a head-mounted display device based on gaze point information.

BACKGROUND

Currently, since most head-mounted display devices (for example, augmented reality (AR) glasses) have no locking and unlocking mechanism, when a user takes off a head-mounted display device, the user's privacy information and the device's security cannot be guaranteed. To this end, some manufacturers provide a method for locking and unlocking a head-mounted display device, which unlocks the head-mounted display device by inputting a password in an input manner such as through gestures or a handle. With the above unlocking method, every time the user performs an unlocking operation, he/she needs to input an alphabet on a virtual keyboard according to gaze point of his/her head, accuracy of the input password in this way may be low, and input speed may be also slow, which greatly degrades the user's experience.

SUMMARY

In view of the foregoing, the present disclosure provides a method and apparatus for unlocking a head-mounted display device based on gaze point information, and a head-mounted display device. With the unlocking method and apparatus of the head-mounted display device, convenience and safety of unlocking operation may be improved, and user's experience may be enhanced.

According to an aspect of the present disclosure, there is provided a method for unlocking a head-mounted display device based on gaze point information. The method may include: acquiring gaze point information of a user who wears a locked head-mounted display device; generating unlocking information according to the gaze point information of the user; performing a matching operation on the unlocking information and a pre-stored unlocking key; and unlocking the head-mounted display device when the unlocking information matches the unlocking key.

Optionally, in an example of the above aspect, the method may further include: acquiring living body feature information of the user through an auxiliary collector; determining whether the user is a living body based on the acquired living body feature information; and unlocking the head-mounted display device when the unlocking information matches the unlocking key may include: unlocking the head-mounted display when the unlocking information matches the unlocking key and the user is a living body.

Optionally, in an example of the above aspect, acquiring gaze point information of a user who wears a locked head-mounted display device may include: acquiring at least one of eye feature information and head posture information of the user through at least one information collector; and determining the gaze point information according to the at least one of the eye feature information and the head posture information.

Optionally, in an example of the above aspect, the method further includes: acquiring environmental feature information; and generating unlocking information according to the gaze point information may include: generating unlocking information according to the gaze point information and the environmental feature information.

Optionally, in an example of the above aspect, the environmental feature information may include at least one of sound information, magnetic field information, current information, temperature information, vibration information and illumination intensity information.

Optionally, in an example of the above aspect, the method may further include: presenting a reference object having at least one feature point, wherein the gaze point information includes a feature point of the reference object that the user is gazing, and generating unlocking information according to the gaze point information may include: generating unlocking information according to the feature point of the reference object that the user is gazing.

Optionally, in an example of the above aspect, the gaze point information may include gaze point track information, and generating unlocking information according to the gaze point information may include: generating unlocking information according to the gaze point track information.

Optionally, in an example of the above aspect, the method may further include: presenting a reference object having at least one feature point, wherein the gaze point information includes feature point track information or a feature point set of the reference object that the user is gazing, and generating unlocking information according to the gaze point information may include: generating unlocking information according to the feature point track information or the feature point set of the reference object that the user is gazing.

Optionally, in an example of the above aspect, the reference object may include a plurality of reference objects.

Optionally, in an example of the above aspect, the plurality of reference objects are presented sequentially; and each reference object is presented after unlocking information obtained for a previous reference object matches the unlocking key.

Optionally, in an example of the above aspect, the unlocking key may be preset by collecting gaze point information of the user.

Optionally, in an example of the above aspect, the head-mounted display device may include augmented reality glasses.

According to another aspect of the present disclosure, there is provided an apparatus for unlocking a head-mounted display device based on gaze point information. The apparatus includes: a gaze point information acquisition module configured to acquire gaze point information of a user who wears a locked head-mounted display device; an unlocking information generation module configured to generate unlocking information according to the gaze point information; a matching module configured to perform a matching operation on the unlocking information and a pre-stored unlocking key; and an unlocking module configured to unlock the head-mounted display device when the unlocking information matches the unlocking key.

Optionally, in an example of the above aspect, the apparatus may further include: a living body feature information acquisition module configured to acquire living body feature information of the user through an auxiliary collector; and a living body determination module configured to determine whether the user is a living body based on the acquired living body feature information, wherein the unlocking module is configured to unlock the head-mounted display device when the unlocking information matches the unlocking key and the user is a living body.

Optionally, in an example of the above aspect, the gaze point information acquisition module may include: a feature information acquisition unit configured to acquire at least one of eye feature information and head posture information of the user through an information collector; and a gaze point information determination unit configured to determine the gaze point information according to the at least one of the eye feature information and the head posture information.

Optionally, in an example of the above aspect, the apparatus may further include: an environment information feature acquisition module configured to acquire environment feature information, wherein the unlocking information generation module is configured to generate the unlocking information according to the gaze point information and the environmental feature information.

Optionally, in an example of the above aspect, the apparatus may further include: a presentation module configured to present a reference object having at least one feature point, wherein the gaze point information includes a feature point of the reference object that the user is gazing, and the unlocking information generation module is configured to generate the unlocking information according to the feature point of the reference object that the user is gazing.

Optionally, in an example of the above aspect, the gaze point information may include gaze point information track information, and the unlocking information generation module is configured to generate the unlocking information according to the gaze point track information.

Optionally, in an example of the above aspect, the apparatus may further include: a presentation module configured to present a reference object having at least one feature point, wherein the gaze point information includes feature point track information or a feature point set of the reference object that the user is gazing, and the unlocking information generation module is configured to generate the unlocking information according to the feature point track information or the feature point set of the reference object that the user is gazing.

Optionally, in an example of the above aspect, the apparatus may further include: an unlocking key setting module configured to pre-set an unlocking key by collecting gaze point information of the user.

According to another aspect of the present disclosure, there is provided a head-mounted display device having the apparatus for unlocking a head-mounted display device based on gaze point information as described above.

According to another aspect of the present disclosure, there is provided a non-transitory machine-readable storage medium, which stores an executable instruction that, when executed, causes a machine to execute the above-mentioned method for unlocking a head-mounted display device based on gaze point information as described above.

According to another aspect of the present disclosure, there is provided a head-mounted display device. The head-mounted display device includes: at least one information collector configured to obtain at least one of eye feature information and head posture information of a user who wears a locked head-mounted display device; at least one processor, and a memory coupled to the at least one processor and configured to store an instruction that, when executed, causes the at least one processor to perform the method for unlocking a head-mounted display device based on gaze point information as described above.

With the method and apparatus for unlocking a head-mounted display device based on gaze point information provided by the present disclosure, gaze point information of the user is collected, unlocking information is generated based on the gaze point information, and it is determined whether to unlock a head-mounted display device based on the unlocking information, convenience of an unlocking operation for the head-mounted display device may be improved, and user's experience may be enhanced.

In addition, with the method and apparatus provided by the present disclosure, it is not easy to make mistakes when the unlocking information is known, and it is difficult to crack through an exhaustive method when the unlocking information is not known, and thus use safety of the head-mounted display device may be further improved.

BRIEF DESCRIPTION OF THE DRAWINGS

Various natures and advantages of the subject matter will be more apparent from the detailed description set forth below when taken in conjunction with the drawings, in which use of the same reference number in different figures indicates similar or identical items.

DETAILED DESCRIPTION

The subject matter described herein will now be discussed with reference to example embodiments. It should be understood that these embodiments are discussed only for the purpose of enabling those skilled persons in the art to better understand and thus implement the subject matter described herein, rather than suggesting a limitation on the scope of protection, applicability, or examples set forth in the claims. Changes may be made in the function and arrangement of the elements discussed without departing from the scope of the disclosure. Each embodiment may omit, substitute, or add various procedures or components as needed. For example, the methods described may be performed in a different order than described, and various steps may be added, omitted, or combined. In addition, features described with respect to some embodiments may also be combined in other embodiments.

As used herein, term "comprise/include" and its variants refer to open terms that mean "comprises/includes, but is not limited to". Term "based on" refers to "based at least in part on". Terms "one embodiment" and "an embodiment" refer to "at least one implementation". Term "another embodiment" refers to "at least one other embodiment". Term "a" or "an" is to be read as "at least one". Terms "first", "second" and the like may refer to different or same objects. Other definitions, explicit and implicit, may be included below. A definition of a term is consistent throughout the description unless the context clearly indicates otherwise.

In the present disclosure, a head-mounted display device may be a head-mounted display hardware device related to the field of virtual reality technology. The head-mounted display device may include, for example, a head-mounted 3D display system, a head-mounted projection system, augmented reality (AR) glasses, and the like.

In the present disclosure, term "gaze point" may be a focus point or a convergence point of a user's eyes. Term "gaze point information" may be information related to gaze point of a user's eyes when the user is gazing, or information that may be used to determine the gaze point of the user, such as information on the center position of the user's pupil; information on the corneal reflection position and other reflection positions; other position information associated with a gaze direction of the user; gaze point track information; a feature point (pattern information), feature point tracks or a feature point set on a reference object that the user is gazing, etc.

In the present disclosure, the head-mounted display device may have at least one information collector. The at least one information collector may include, for example, at least one of an image collector, a motion measurement unit, a sound measurement device, an electromagnetic detection device, a bioelectric device, a temperature sensor, a vibration sensor, and an illumination intensity sensor.

The image collector may be configured to collect a user's facial image or a user's eye image. The collected facial image or eye image may be a single frame of image or successive frames of images. Here, the successive frames of images may be acquired within a predetermined period of time.

The motion measurement unit may be configured to perceive head posture information of a user, such as head posture information or head posture movement information. For example, the motion measurement unit may be an inertial measurement unit (IMU). In an example, the IMU may include a gyroscope. The gyroscope may be configured to accurately measure a user's head posture information (i.e., stationary head posture information). In addition, in another example, the IMU may also include a gyroscope and an accelerometer. The gyroscope may be configured to accurately measure a user's continuous head posture information, and the accelerometer may be configured to calculate the user's head displacement through quadratic integration, thereby obtaining the user's head posture movement information, that is, changes in angle and position of the user's head etc.

The sound measuring device may be configured to sense a user's sound information. For example, the sound measuring device may include an ultrasonic device. The electromagnetic detection device may be configured to sense magnetic field information, and the bioelectric device may be configured to sense current information. The temperature sensor may be configured to sense temperature information of a user's body or a user's environment. The vibration sensor may be configured to sense vibration information of a user's body. The illumination intensity sensor may be configured to sense illumination intensity information of a user's environment. In the present disclosure, sound information, magnetic field information, current information, temperature information, vibration information, and illumination intensity information may also be collectively referred to as environmental feature information.

First Embodiment

Figure 1:
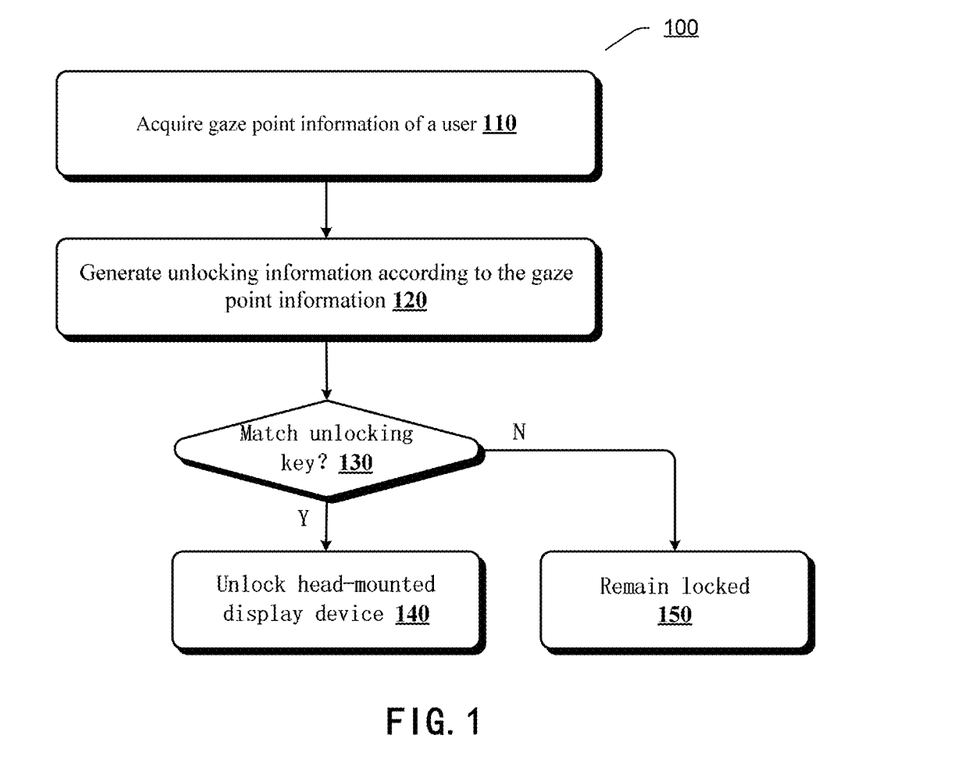
FIG. 1 shows a flowchart of a method for unlocking a head-mounted display device based on gaze point information according to a first embodiment of the present disclosure.

FIG. 1 shows a flowchart of a method for unlocking a head-mounted display device based on gaze point information according to a first embodiment of the present disclosure.

As shown in FIG. 1, after a user wears a locked head-mounted display device, at block 110, gaze point information of the user is acquired. In the first embodiment, the gaze point information of the user may be gaze point track information of the user. For example, each gaze point in the gaze point track may be represented by a space coordinate corresponding to the gaze point. The gaze point track information may be movement track information of space coordinate points corresponding to a plurality of gaze points of the user.

For instance, in an example, successive frames of user's facial images or user's eye images may be collected by an image collector. For example, the image collector may be configured to collect the user's facial image or the user's eye image (eye image of a single eye or two eyes) for a continuous period of time. After successive frames of user's facial images or user's eye images are acquired, eye feature points (i.e., eye feature information) in each frame of image are extracted; and thus gaze point track information may be determined according to changes in eye feature points in the plurality of frames of images.

Specifically, for instance, in an example, feature points in the image may be extracted by analyzing the acquired successive frames of images. Next, the user's eye movements (eye movements of a single eyeball or two eyeballs) such as position changes and angle changes are calculated using computer vision-related algorithms, and thus gaze point track information is determined based on the user's eye movements. In another example, changes in angle and position of the user's gaze point may be determined by analyzing information obtained with an eye-tracking camera. In another example, feature points and corresponding depth information in the image may be extracted by analyzing the acquired successive frames of images. Next, the user's eye movement is calculated using computer vision-related algorithms, so as to determine gaze point track information, and thus the user's gaze point information may be obtained.

In another example, the user's head movement information (for example, head posture movement information) may be sensed with a movement measurement unit, and the user's gaze point information may be determined according to the head movement information. Optionally, the motion measurement unit may be an IMU. The IMU includes a gyroscope and an accelerometer. The gyroscope is configured to accurately measure the user's head posture information. The accelerometer obtains the user's head displacement through quadratic integral calculation, thereby obtaining the user's head movement information. The user's head movement information, that is, position changes and angle changes, may be calculated by analyzing the user's movement angle, acceleration, geomagnetic field changes or the like provided by the IMU. Then, the gaze point track information is determined according to the head movement information, so as to obtain the gaze point information of the user.

In addition, in another example, the user's eye feature information and head posture information may be detected through an image collector and a motion measurement unit, and gaze point track information may be determined according to changes in the eye feature information and the head posture information, so as to obtain the user's gaze point information.

Figure 2:
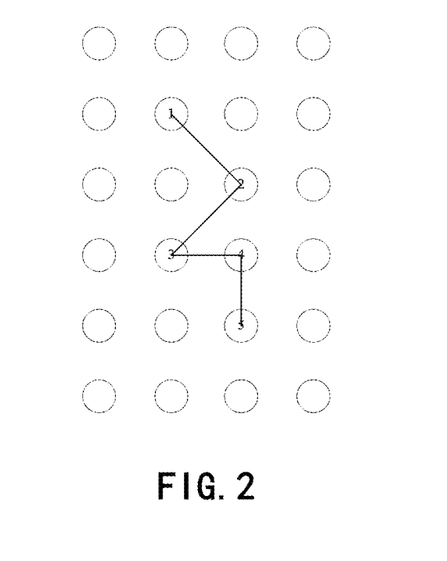
FIG. 2 shows a schematic diagram of an example of gaze point information according to the first embodiment of the present disclosure.

FIG. 2 shows a schematic diagram of an example of gaze point information according to the first embodiment of the present disclosure. As shown in FIG. 2, the gaze point track is formed by a gaze point changing from point 1 to point 2, and then sequentially to points 3, 4, and 5.

After the gaze point information of the user is obtained as described above, at block 120, unlocking information is generated according to the gaze point information. For instance, in an example, the gaze point track information may be used as the unlocking information. In addition, in another example, after a specific transformation is performed on the gaze point track information, the transformed result may be used as the unlocking information. For example, the specific transformation may be encryption processing or the like.

In addition, in another example, environmental feature information may also be obtained. The environmental feature information may include at least one of sound information, magnetic field information, current information, temperature information, vibration information, and/or illumination intensity information. For example, environmental feature information may be obtained by detecting the user's sound information, magnetic field information, current information, temperature information, vibration information, and/or illumination intensity through a sound measurement device, an electromagnetic detection device, a bioelectric device, a temperature sensor, a vibration sensor, and/or an illumination intensity sensor.

Correspondingly, generating unlocking information according to the gaze point information may include: generating unlocking information according to the gaze point information and the environment feature information. For example, the environment feature information may be the user's sound information, such as, the voice information "unlocked" spoken by the user, or the user's voiceprint information obtained through the user's sound information. The unlocking information may be generated based on the gaze point information and the sound information. Correspondingly, the unlocking key is also generated based on the gaze point information and the sound information. Here, only sound information is used as an example to illustrate how to generate unlocking information based on the combination of gaze point information and the environmental feature information. The way to generate the unlocking information with the combination of the gaze point information and one or more of the environmental feature information may be implemented in any suitable manner known in the art.

At block 130, a matching operation is performed on the obtained unlocking information and a pre-stored unlocking key. Here, the unlocking key may be preset by collecting gaze point information of the user (in this example, the gaze point information is the gaze point track information). For example, the unlocking key may be the user's gaze point track information, or it may be generated by processing the user's gaze point track information in the same or a matching manner as that of the generation of the unlocking information. In other examples, the unlocking key may also be preset using the user's gaze point information and environmental feature information.

If the unlocking information matches the unlocking key, at block 140, the head-mounted display device is unlocked. If the unlocking information does not match the unlocking key, then at block 150, the head-mounted display device remains locked.

After the head-mounted display device is successfully unlocked, the user may use the head-mounted display device. When the user temporarily leaves, the head-mounted display device may be locked again. For example, the head-mounted display device receives the user's locking instruction and initiates the locking action. Or, when the head-mounted display device does not detect any operation within a preset time period, it is determined that the user leaves by default, the head-mounted display device is locked again. Or, after the head-mounted display device does not detect any operation within a preset time period, it prompts the user that the device is about to be locked. If the user's operation is not received within a predetermined time, the locking action is initiated to lock the head-mounted display device again. According to the above method, it is possible to prevent other person from using the head-mounted display device without permission, which helps to protect user's privacy information and improve security of the head-mounted display device.

With the method of the first embodiment, it is possible to obtain the user's gaze point track information, use the gaze point track information to generate unlocking information, and perform a matching operation on the generated unlocking information and a pre-stored unlocking key to carry out an unlocking operation, thereby improving convenience and safety of the unlocking operation, and enhancing user's experience.

Second Embodiment

Figure 3:
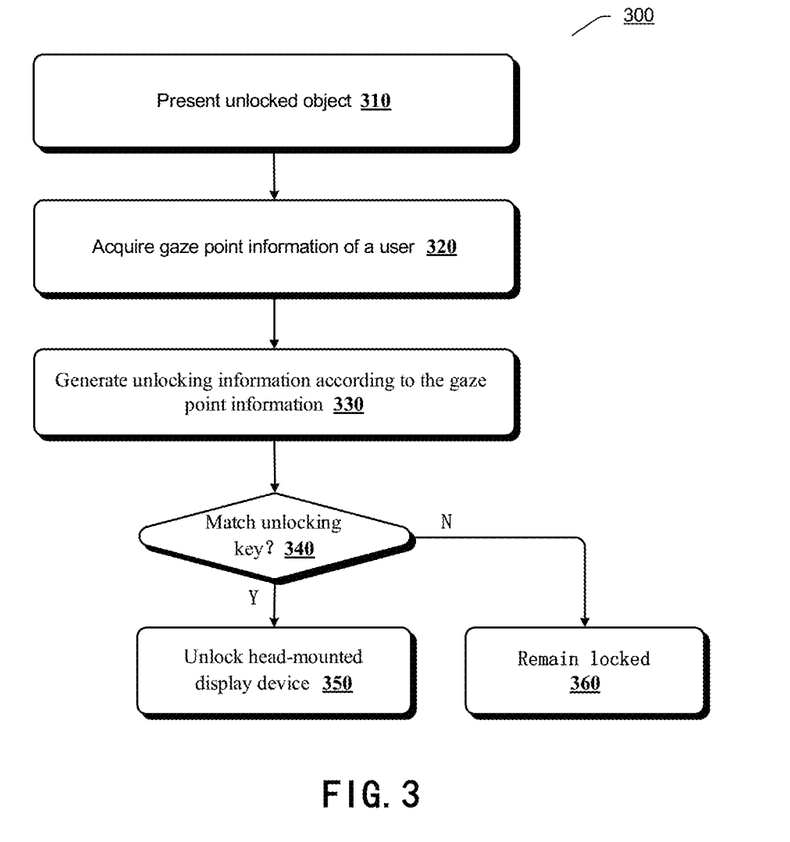
FIG. 3 shows a flowchart of a method for unlocking a head-mounted display device based on gaze point information according to a second embodiment of the present disclosure.

FIG. 3 shows a flowchart of a method for unlocking a head-mounted display device based on gaze point information according to a second embodiment of the present disclosure.

As shown in FIG. 3, at block 310, a reference object is presented. The reference object may be a preset image, an image set, an object, or an object set for a user to perform unlocking processing. The image may include an array of graphics. The reference object may be a virtual projection object, such as a 3D virtual image presented in the view field of the user, or may be an object presented on the display of a head-mounted display device, such as an image presented on the display.

Figure 4:
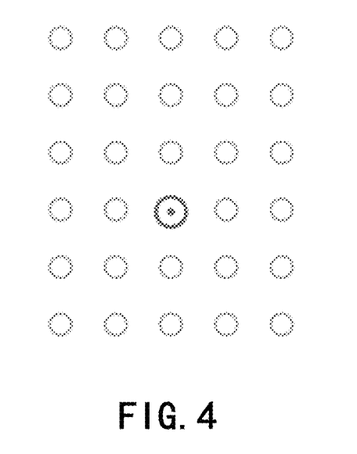
FIG. 4 shows a schematic diagram of an example of gaze point information according to the second embodiment of the present disclosure.
Figure 5:
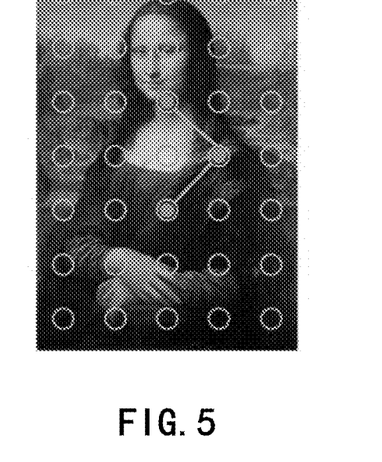
FIG. 5 shows a schematic diagram of another example of gaze point information according to the second embodiment of the present disclosure.

In the present disclosure, the reference object may contain feature points for the user to select. For example, all circles or selected circles (for example, circles with black dots or gray color patches therein) shown in FIG. 4 and FIG. 5, or the graphics shown in FIG. 7 and FIG. 8. In addition, the reference object may also include a background with feature points. The background may be colorless, as shown in FIG. 4, or may be a portrait, such as the portrait of the Mona Lisa, as shown in FIG. 5. When the background is a portrait, the user may easily and quickly determine location of the feature point according to the features of the portrait.

At block 320, the user's gaze point information is acquired.

In an example, the gaze point information may be a single feature point of the reference object that the user is gazing. FIG. 4 shows a schematic diagram of an example of gaze point information according to the second embodiment of the present disclosure. In FIG. 4, the gaze point information is a feature point represented by a circle with a dot in the displayed image.

Specifically, a matching operation is performed on the space coordinates of the gaze point and the space coordinates of the feature points in the image. If the distance between the space coordinates of the gaze point and the space coordinates of a certain feature point of the image is within a set threshold, or if the spatial coordinates of the two are completely the same, the feature point is taken as the gaze point information.

In another example, the gaze point information may be feature point track information or a feature point set of the reference object that the user is gazing. FIG. 5 shows a schematic diagram of another example of gaze point information according to the second embodiment of the present disclosure. In FIG. 5, the gaze point information is track information formed by connecting feature points represented by circles with dots in the displayed image. In the present disclosure, the feature point set may be a pattern set corresponding to the feature point. The pattern may be an image pattern, a character pattern or patterns of other types. For example, a pattern "dog", "cat" or a character "elephant" or the like in the reference object that user is gazing. The feature point set may include a set of image patterns and/or character patterns. In addition, in another example, the gaze point information may also be location point information generated based on the user's gaze point movement track and feature points on the gaze point movement track.

In the case where the gaze point information is the feature point track information or the feature point set of the reference object that the user is gazing, the reference object may include one or a plurality of reference objects. If the reference object includes a plurality of reference objects, the plurality of reference objects may be presented simultaneously or sequentially.

At block 330, unlocking information is generated according to the gaze point information. For instance, in an example, a feature point, feature point track information, or a feature point set may be used as unlocking information. In addition, in another example, after a specific transformation may be performed on the feature point, the feature point track information, or the feature point set, the transformed result may be used as the unlocking information. The specific transformation may be encryption processing or the like, for example.

At block 340, a matching processing is performed on the obtained unlocking information and the pre-stored unlocking key. Here, the unlocking key may be preset by collecting the user's feature point, feature point track information or feature point set. For example, the unlocking key may be the user's feature point, feature point track information, or feature point set. Or the unlocking information may be generated by processing the user's feature point, feature point track information, or feature point set with the same manner or a matching manner as that of generation of the unlocking key.

If the unlocking information matches the unlocking key, at block 350, the head-mounted display device is unlocked. If the unlocking information does not match the unlocking key, then at block 360, the head-mounted display device remains locked.

In addition, optionally, in other examples of this embodiment, before the operation at block 310, the method may further include a pre-calibration process. For example, the pre-calibration process may include actions as follows: first, a calibration object is presented, and the calibration object may be a dot, for example. The user is prompted to gaze the calibration object near the calibration object. When the user gazes the calibration object, the corresponding user's gaze point information may be obtained, for example, the spatial coordinates of the calibration object. Then, a calibration operation is performed based on the acquired gaze point information and the real information of the calibration object. For example, a coordinate difference may be determined based on the acquired spatial coordinates of the gaze point and the spatial coordinates of the calibration object, and then the determined coordinate difference may be used as a correction value to calibrate the subsequently acquired gaze point information.

With the method of the second embodiment, it is possible to obtain the single feature point information, feature point track information, or a feature point set of the reference object that the user is gazing, and the single feature point information, the feature point track information or the feature point set is used to generate unlocking information. A matching operation is performed on the generated unlocking information and a pre-stored unlocking key so as to carry out an unlocking operation, thereby improving convenience and safety of unlocking operation, and enhancing user's experience.

Third Embodiment

Figure 6:
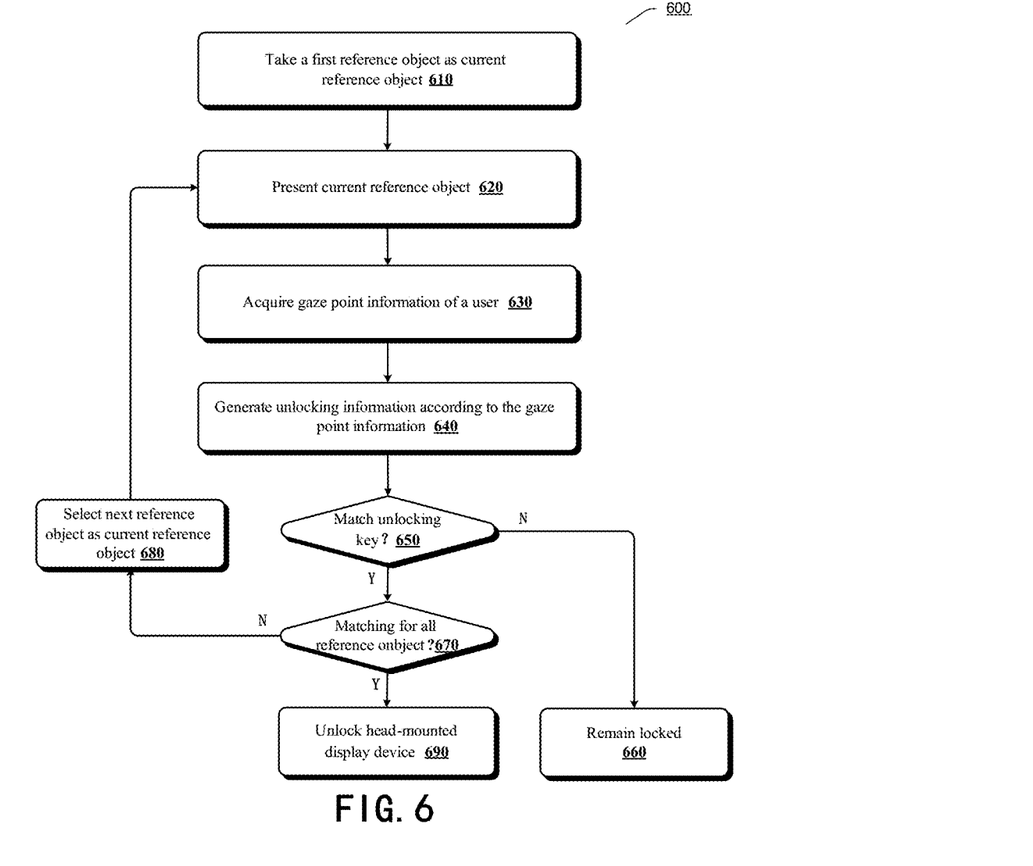
FIG. 6 shows a flowchart of a method for unlocking a head-mounted display device based on gaze point information according to a third embodiment of the present disclosure.

FIG. 6 shows a flowchart of a method for unlocking a head-mounted display device based on gaze point information according to a third embodiment of the present disclosure.

In the third embodiment, a plurality of reference objects are used for unlocking operation, and the plurality of reference objects are sequentially displayed. For example, a presentation order of the plurality of reference objects is preset. When performing reference object presentation, the plurality of reference objects are presented in the presentation order; and each reference object is presented after unlocking information obtained for a previous reference object matches the unlocking key.

Figure 7:
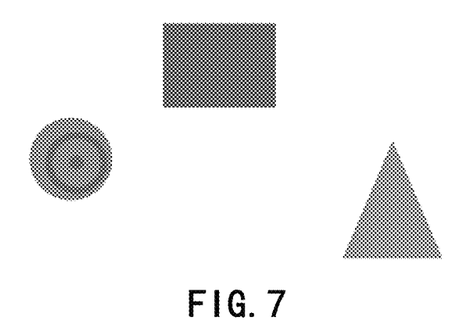
FIG. 7 and FIG. 8 show schematic diagrams of display of a reference object according to the third embodiment of the present disclosure.

For example, a plurality of images may be set in advance and the presentation order of the images may be set, and each image contains a feature pattern for the user to select. According to the preset presentation order, the first image stored in advance is presented through a display unit. As shown in FIG. 7, the patterns in the first image include a rectangle, a circle, and a triangle. The rectangle, circle and triangle may be set in different colors for easier distinction.

As shown in FIG. 6, at blocks 610 and 620, the first reference object is presented as the current reference object, for example, it may be presented in the view field of the user, or presented on the display unit of the head-mounted display device. It should be noted herein that the operations at block 610 and block 620 may be executed in the same step. For convenience of subsequent description, when the first reference object is presented, it is described in two block operations.

At block 630, the user's gaze point information is acquired. The gaze point information may be a single feature point of the reference object that the user is gazing. Alternatively, the gaze point information may be feature point track information or a feature point set of a reference object (a single reference object) that the user is gazing.

At block 640, unlocking information is generated according to the obtained gaze point information. The unlocking information generation process at block 640 is the same as the unlocking information generation process at block 330 in FIG. 3, and will not be described.

After the unlocking information is generated, at block 650, a matching operation is performed on the obtained unlocking information and a pre-stored unlocking key. The matching process at block 650 is the same as the process at block 340 in FIG. 3, and will not be described.

If the matching operation is unsuccessful, then at block 660, the head-mounted display device remains locked, and a password error prompt is issued. If the matching operation is successful, then at block 670, it is determined whether the matching operation is completed for all reference objects.

Figure 8:
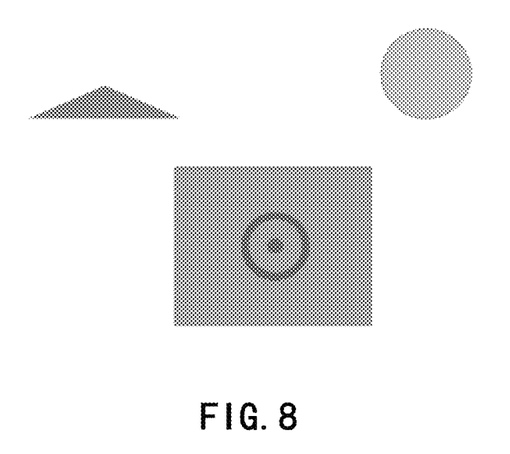

If there is still a reference object for which the matching operation is not completed, at block 680, a next reference object is selected as a current reference object, and then the process returns to the block 620 to perform a matching operation for the next reference object. FIG. 8 shows a schematic diagram of the display of the second reference object according to the third embodiment of the present disclosure.

If the matching operation is completed for all reference objects, then at block 690, the head-mounted display device is unlocked.

Likewise, in other examples of the third embodiment, before the operation at block 610, the method may also include a pre-calibration process similar to that in the second embodiment.

Fourth Embodiment

Figure 9:
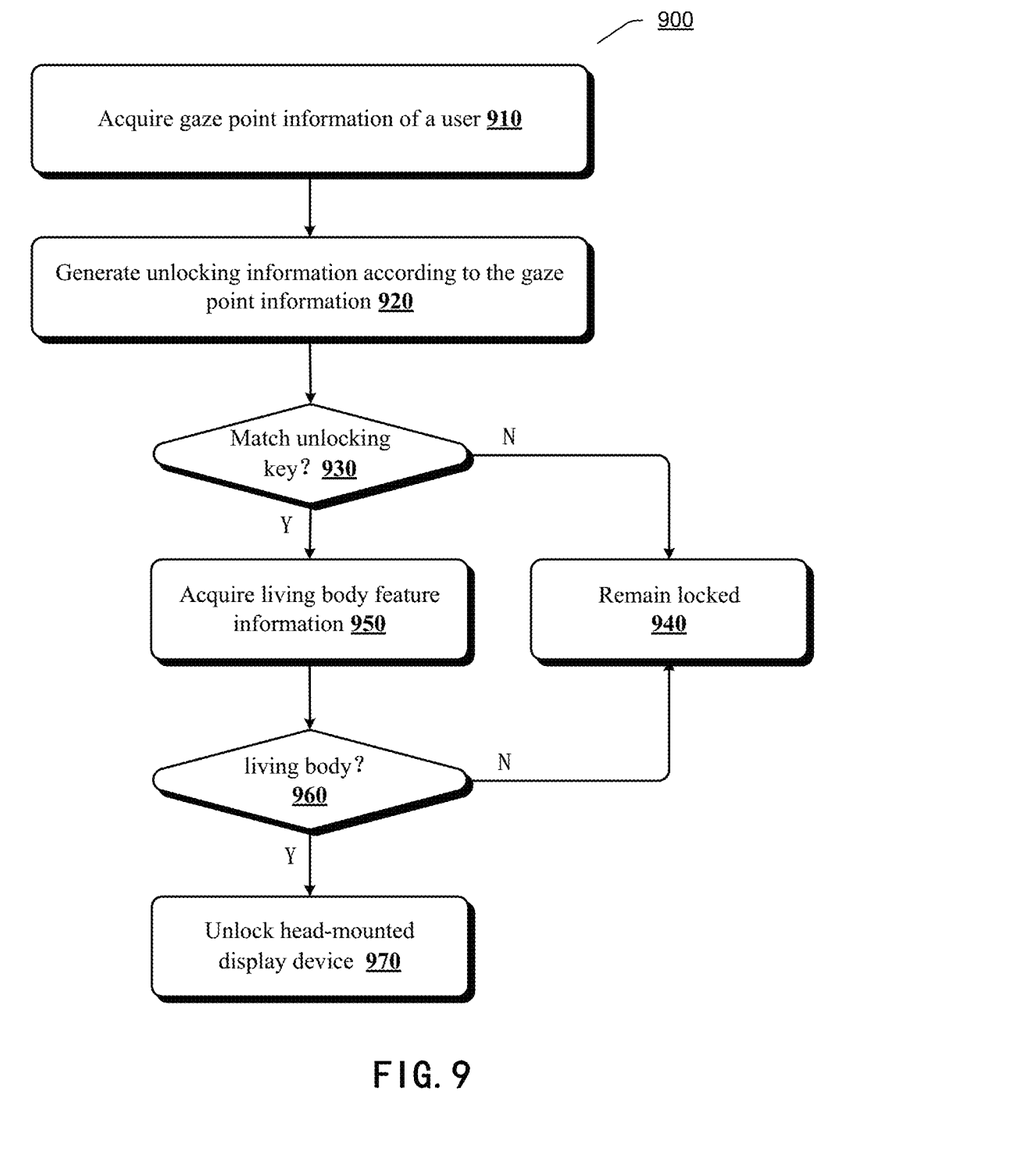
FIG. 9 shows a flowchart of a method for unlocking a head-mounted display device based on gaze point information according to a fourth embodiment of the present disclosure.

FIG. 9 shows a flowchart of a method for unlocking a head-mounted display device based on gaze point information according to a fourth embodiment of the present disclosure. The fourth embodiment is a modification of the first embodiment shown in FIG. 1. The operations at the blocks 910 to 940 in FIG. 9 are the same as the operations at the blocks 310 to 340 shown in FIG. 1, and will not be described.

When the operation at block 930 is determined to be matching, at block 950, living body feature information of the user is collected by an auxiliary collector. In the present disclosure, the living body feature information may include body temperature data, heart rate data, or pulse data, etc. For example, the user's body temperature information, heart rate information, or pulse information may be collected through a thermometer, a heart rate meter, or a pulse meter, and the body temperature data, the heart rate data, or the pulse data may be extracted from the user's body temperature information, the heart rate information, or the pulse information, respectively.

At block 960, based on the collected living body feature information, it is determined whether the user is a living body. If the body temperature data, the heart rate data, and/or the pulse data are within a set range, it is considered that the user is a living body, and thus, at block 970, the head mounted display device is unlocked.

If the body temperature data, the heart rate data, or the pulse data are not within the set range, it is considered that the user is not a living body, and thus, at block 940, the head-mounted display device remains locked.

In addition, it should be noted that the operations at blocks 950 and 960 in FIG. 9 may also be performed before the block 910. Accordingly, when the user is not a living body, the head-mounted display device is not unlocked. When the user is a living body, the operations at blocks 910 to 930 are performed, and when the unlocking key does not be matched, the head-mounted display device is not unlocked, and when the unlocking key is matched, the head-mounted display device is unlocked.

It should be explained here that the fourth embodiment shown in FIG. 9 is a modification of the first embodiment. In other embodiments of the present disclosure, the above-mentioned modifications may also be made to FIG. 3 and FIG. 6, that is, the operations at blocks 950 and 960 are added to the embodiments shown in FIG. 3 and FIG. 6.

Fifth Embodiment

Figure 10:
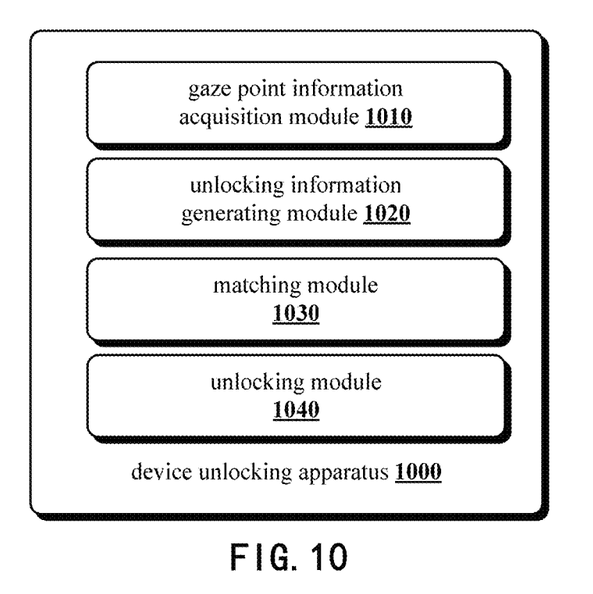
FIG. 10 shows a block diagram of an apparatus for unlocking a head-mounted display device based on gaze point information according to a fifth embodiment of the present disclosure.

FIG. 10 shows a block diagram of an apparatus (hereinafter referred to as a device unlocking apparatus 1000) for unlocking a head-mounted display device based on gaze point information according to a fifth embodiment of the present disclosure.

As shown in FIG. 10, the device unlocking apparatus 1000 includes a gaze point information acquisition module 1010, an unlocking information generation module 1020, a matching module 1030, and an unlocking module 1040.

The gaze point information acquisition module 1010 is configured to acquire gaze point information of the user who wears a locked head-mounted display device. The operation of the gaze point information acquisition module 1010 may refer to the operation at the block 110 described above with reference to FIG. 1 and the operation at the block 910 described with reference to FIG. 9.

Figure 11:
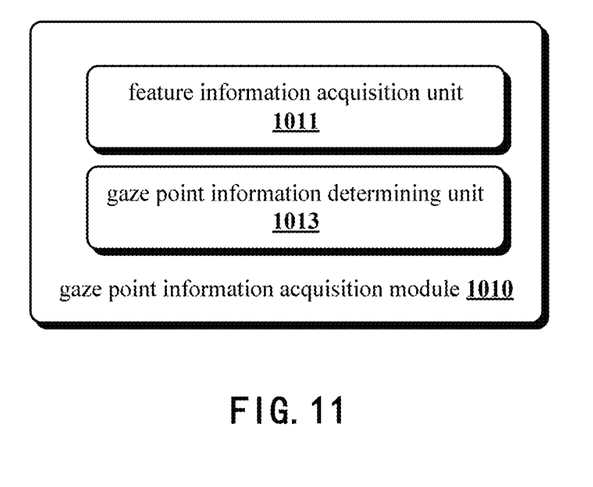
FIG. 11 shows a block diagram of an example of a gaze point information acquisition module according to the fifth embodiment of the present disclosure.

FIG. 11 shows a block diagram of an example of the gaze point information acquisition module 1010 according to the fifth embodiment of the present disclosure.

As shown in FIG. 11, the gaze point information acquisition module 1010 includes a feature information acquisition unit 1011 and a gaze point information determination unit 1013.

The feature information acquisition unit 1011 is configured to acquire at least one of eye feature information and head posture information of the user through an information collector.

The gaze point information determination unit 1013 is configured to determine the gaze point information according to the at least one of the eye feature information and the head posture information.

The unlocking information generation module 1020 is configured to generate unlocking information according to the gaze point information. The operation of the unlocking information generation module 1020 may refer to the operation at the block 120 described above with reference to FIG. 1 and the operation at the block 920 described with reference to FIG. 9.

The matching module 1030 is configured to perform a matching operation on the unlocking information and a pre-stored unlocking key. The operation of the matching module 1030 may refer to the operation at the block 130 described above with reference to FIG. 1 and the operation at the block 930 described with reference to FIG. 9.

The unlocking module 1040 is configured to unlock the head-mounted display device when the unlocking information matches the unlocking key. The operation of the unlocking module 1040 may refer to the operation at the block 140 described above with reference to FIG. 1 and the operation at the block 970 described with reference to FIG. 9.

Sixth Embodiment

Figure 12:
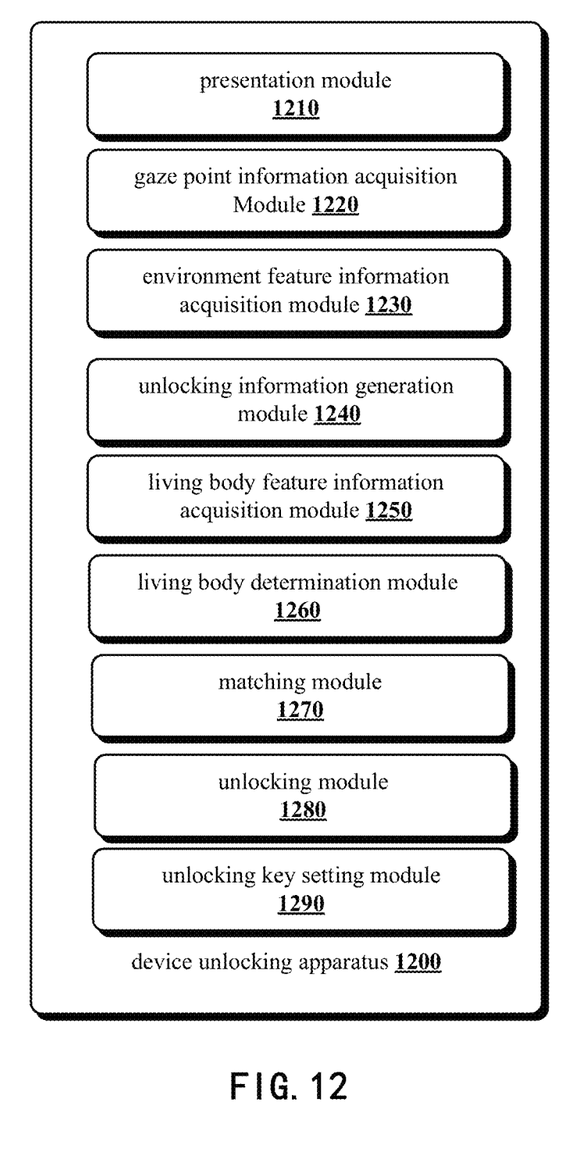
FIG. 12 shows a block diagram of an apparatus for unlocking a head-mounted display device based on gaze point information according to a sixth embodiment of the present disclosure.

FIG. 12 shows a block diagram of an apparatus (hereinafter referred to as a device unlocking apparatus 1200) for unlocking a head-mounted display device based on gaze point information according to a sixth embodiment of the present disclosure.

As shown in FIG. 12, the device unlocking apparatus 1200 includes a presentation module 1210, a gaze point information acquisition module 1220, an environment feature information acquisition module 1230, an unlocking information generation module 1240, a living body feature information acquisition module 1250, a living body determination module 1260, a matching module 1270, an unlocking module 1280, and an unlocking key setting module 1290.

The presentation module 1210 is configured to present a reference object. The operation of the presentation module 1210 may refer to the operation at the block 310 described above with reference to FIG. 3 and the operation at the block 620 described with reference to FIG. 6.

The gaze point information acquisition module 1220 is configured to acquire gaze point information of a user who wears a locked head-mounted display device. The operation of the gaze point information acquisition module 1220 may refer to the operation at the block 320 described above with reference to FIG. 3 and the operation at the block 630 described with reference to FIG. 6.

The environmental feature information acquisition module 1230 is configured to acquire environmental feature information. The environmental feature information may include at least one of sound information, magnetic field information, current information, temperature information, vibration information, and/or illumination intensity information. For example, the environmental feature information acquisition module 1230 may be connected to a sound measurement device, an electromagnetic detection device, a bioelectric device, a temperature sensor, a vibration sensor, and/or an illumination intensity sensor in a wired or wireless manner. In this case, the user's sound information, magnetic field information, current information, temperature information, vibration information, and/or illumination intensity information are sensed by the sound measurement equipment, the electromagnetic detection equipment, the bioelectric equipment, the temperature sensor, the vibration sensor, and/or the illumination intensity sensor, and used as environmental feature information. Then, the sensed environmental feature information is sent to the environmental feature information acquisition module 1230 in a wireless or wired communication manner.

The unlocking information generation module 1240 is configured to generate unlocking information according to the gaze point information. The operation of the unlocking information generation module 1240 may refer to the operation at block 330 described above with reference to FIG. 3 and the operation at block 640 described with reference to FIG. 6.

The living body feature information acquisition module 1250 is configured to acquire living body feature information of the user through an auxiliary collector. The operation of the living body feature information acquisition module 1250 may refer to the operation at block 950 described above with reference to FIG. 9.

The living body determination module 1260 is configured to determine whether the user is a living body based on the acquired living body feature information. The operation of the living body determination module 1260 may refer to the operation at the block 960 described above with reference to FIG. 9.

The matching module 1270 is configured to perform a matching operation on the unlocking information and a pre-stored unlocking key. The operation of the matching module 1270 may refer to the operation at the block 340 described above with reference to FIG. 3 and the operation at the block 650 described with reference to FIG. 6.

The unlocking module 1280 is configured to unlock the head-mounted display device when the unlocking information matches the unlocking key. The operation of the unlocking module 1280 may refer to the operation at the block 350 described above with reference to FIG. 3, the operation at the block 650 described with reference to FIG. 6, and the operation at the block 970 described with reference to FIG. 9.

The unlocking key setting module 1290 is configured to pre-set an unlocking key by collecting gaze point information of the user.

It should be noted here that in other embodiments of the present disclosure, one or more of the presentation module 1210, the environmental feature information acquisition module 1230, the living body feature information acquisition module 1250, the living body determination module 1260, and the unlock key setting module 1290 in FIG. 12 may be omitted.

The embodiments of the method and apparatus for unlocking a head-mounted display device based on gaze point information according to the present disclosure are described above with reference to FIG. 1 to FIG. 12. The above device unlocking apparatus may be implemented by hardware, or by software or a combination of hardware and software.

Seventh Embodiment

Figure 13:
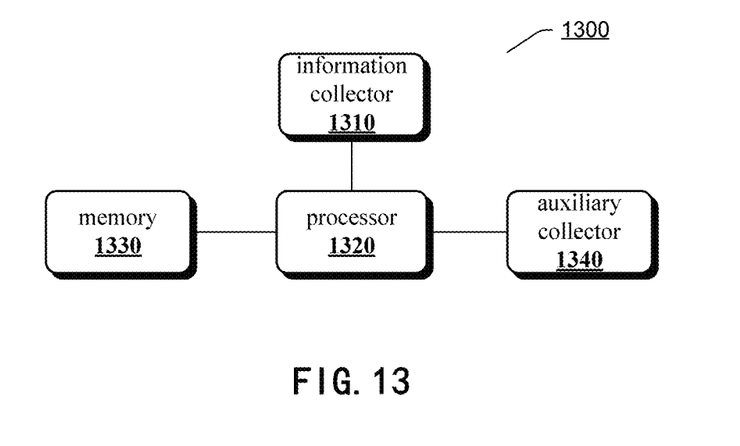
FIG. 13 shows a block diagram of a computing device for unlocking a head-mounted display device based on gaze point information according to a seventh embodiment of the present disclosure.

FIG. 13 shows a block diagram of a head-mounted display device 1300 according to a seventh embodiment of the present disclosure.

As shown in FIG. 13, the head-mounted display device 1300 includes at least one information collector 1310, at least one processor 1320, and a memory 1330.

The at least one information collector 1310 is configured to obtain a user's eye feature information and/or head posture information. The information collector 1310 may include, for example, an image collector and/or a motion measurement unit.

The at least one processor 1320 executes at least one computer-readable instruction (i.e., the above-mentioned element implemented in the form of software) stored or encoded in a computer-readable storage medium (i.e., the memory 1330).

In an embodiment, a computer-executable instruction is stored in the memory 1330, which, when executed, causes at least one processor 1320 to: acquire gaze point information of a user who wears a locked head-mounted display device; generate unlocking information according to the gaze point information; perform a matching operation on the unlocking information and a pre-stored unlocking key; and unlock the head-mounted display device when the unlocking information matches the unlocking key.

It should be understood that, when the computer-executable instruction stored in the memory 1330 is executed, the computer-executable instruction causes the at least one processor 1320 to perform various operations and functions described above in conjunction with FIG. 1-12 in the various embodiments of the present disclosure.

In addition, the head-mounted display device 1300 may further include an auxiliary collector 1340. The auxiliary collector 1340 is configured to collect living body feature information of the user.

In addition, the head-mounted display device 1300 may further include at least one environmental feature information collector configured to acquire environmental feature information. The environmental feature information collector may include, for example, one or more of a sound measurement device, an electromagnetic detection device, a bioelectric device, a temperature sensor, a vibration sensor, and/or an illumination intensity sensor.

In addition, in other embodiments of the present disclosure, the head-mounted display device may be a head-mounted display device including the device unlocking apparatus 1200 described above with reference to FIG. 12 and a modification thereof.

Eighth Embodiment

Figure 14:
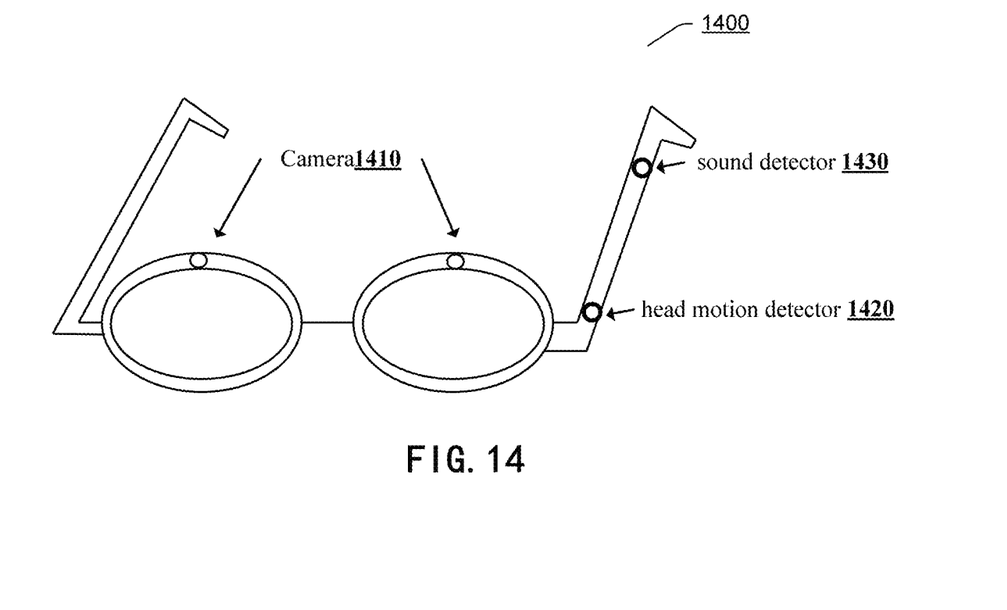
FIG. 14 shows a schematic structural diagram of AR glasses according to an eighth embodiment of the present disclosure.

FIG. 14 shows a schematic structural diagram of AR glasses 1400 according to an eighth embodiment of the present disclosure.

As shown in FIG. 14, the AR glasses 1400 may include at least one camera (or miniature camera) 1410. The at least one camera 1410 is arranged on a frame body of the AR glasses and is configured to be located in front of the user's eyes when worn. The at least one camera 1410 is configured to obtain the user's eye image, so as to extract the user's eye feature information. Generally, the at least one camera 1410 includes two cameras, which are respectively arranged on left and right frames of the AR glasses 1400, as shown in FIG. 14.

The AR glasses 1400 may include a head motion detector 1420. The head motion detector 1420 may be arranged at any position of the frame body of the AR glasses 1400 to detect the user's head posture information. The head motion detector 1420 may be implemented by a motion measurement unit.

The AR glasses 1400 may further include a sound detector 1430. The sound detector 1430 may be arranged at any position of the main body of the frame of the AR glasses 1400 to detect the user's sound information.

The AR glasses 1400 also include at least one processor (not shown) and a memory (not shown). The at least one processor is connected to at least one camera 1410, the head motion detector 1420, and/or the sound detector 1430, and is configured to obtain eye images captured by the at least one camera 1410, head posture information detected by the head motion detector 1420 and/or sound information detected by the sound detector 1430.

The at least one processor is also connected to the memory and executes at least one computer-readable instruction stored or encoded in the memory 1330 (i.e., the above-mentioned element implemented in the form of software).

A computer-executable instruction is stored in the memory. When the computer-executable instruction is executed, the at least one processor is caused to: obtain gaze point information of a user who wears a locked head-mounted display device; generate unlocking information according to the gaze point information; perform a matching operation on the unlocking information and a pre-stored unlocking key; and unlock the head-mounted display device when the unlocking information matches the unlocking key.

The AR glasses 1400 may also include an auxiliary collector, such as a thermometer, a heart rate meter, or a pulse meter.

The AR glasses 1400 may also include a sensor, such as a light sensor, a motion sensor, or other type of. The light sensor may include an ambient light sensor, and the ambient light sensor may perceive whether the AR glasses are worn according to the brightness of the ambient light.

The AR glasses 1400 may further include a display unit for displaying information input by the user or information provided to the user, and a preset image. The display unit may include an MR (mixed reality) module, an AR (augmented reality) module, or a VR (virtual reality) module.

It should be understood that the structure shown in FIG. 14 is only for illustration, and the AR glasses may also include more or fewer components than those shown in FIG. 14, or have a configuration different from the configuration shown in FIG. 14. The components shown in FIG. 14 may be implemented by hardware, software or a combination thereof.

According to an embodiment, a program product such as a non-transitory machine-readable medium is provided. The non-transitory machine-readable medium may have instructions (i.e., the above elements implemented in software) thereon which, when executed by a machine, cause the machine to perform the operations or functions as described above with reference to FIG. 1 to FIG. 12 in various embodiments of the subject matter. Specifically, a system or apparatus provided with a readable storage medium may be provided, and a software program code for realizing the functions of any of the above embodiments may be stored on the readable storage medium and may be read out and executed by the machine.

In this case, the program code itself read from the readable storage medium may realize the functions of any of the above embodiments, and thus the machine readable code and the readable storage medium storing the machine readable code form part of the present disclosure.

Examples of the readable storage media may include floppy disks, hard disks, magneto-optical disks, optical disks (such as CD-ROM, CD-R, CD-RW, DVD-ROM, DVD- RAM, DVD-RW, DVD-RW), magnetic tape, non-volatile memory card, and ROM. Alternatively, a program code may be downloaded from a server computer or cloud via a communication network.

It should be noted that not all steps and units in the above-mentioned processes and system architecture diagrams are necessary, and certain steps or units may be omitted as needed. The execution order of each step is not fixed and may be adjusted as needed. The structures of the apparatus described in the foregoing embodiments may be physical structures or logical structures, that is, some units may be implemented by the same physical entity, or some units may be implemented by a plurality of different physical entities, respectively, or may be implemented by some components of a plurality of standalone device together.

In the above embodiments, the hardware unit or module may be implemented by mechanical or electrical means. For example, a hardware unit, module, or processor may include a permanently dedicated circuitry or logic (e.g., a specialized processor, FPGA, or ASIC) to perform the corresponding operations. A hardware unit or processor may also include a programmable logic or circuitry (such as a general-purpose processor or other programmable processor) that may be temporarily set by software to perform the corresponding operations. Specific implementations (mechanical, or dedicated, permanent circuits, or temporarily set up circuits) may be determined based on cost and time considerations.

The description set forth herein, in connection with the appended drawings, describes example configurations and does not represent all the examples that may be implemented or that are within the scope of the claims. Term "exemplary" used herein means "serving as an example, instance, or illustration", and not "preferred" or "advantageous over other examples". The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for unlocking a head-mounted display device based on gaze point information, comprising:
    acquiring gaze point information of a user who wears a locked head-mounted display device;
    generating unlocking information according to the gaze point information;
    performing a matching operation on the unlocking information and a pre-stored unlocking key; and
    unlocking the head-mounted display device when the unlocking information matches the unlocking key;
    wherein acquiring gaze point information of a user who wears a locked head-mounted display device comprises:
    acquiring eye feature information of the user through at least one information collector; and
    determining the gaze point information according to the eye feature information,
    wherein acquiring eye feature information of the user through at least one information collector comprises:
    acquiring successive a plurality of frames of the user's facial images or the user's eye images, and
    extracting eye feature points in each frame of the user's facial images or the user's eye images, and
    wherein determining the gaze point information according to the eye feature information comprises:
    determining gaze point track information according the changes in the eye feature points in the plurality of frames of the user's facial images or the user's eye images, wherein the gaze point information is configured as the gaze point track information.

2. The method of claim 1, further comprising:
    acquiring living body feature information of the user through an auxiliary collector, and
    determining whether the user is a living body based on the acquired living body feature information,
    wherein unlocking the head-mounted display device when the unlocking information matches the unlocking key comprises:
    unlocking the head-mounted display when the unlocking information matches the unlocking key and the user is a living body.

3. The method of claim 1, wherein acquiring gaze point information of a user who wears a locked head-mounted display device further comprises:
    acquiring head posture information of the user through at least one information collector,
    wherein determining the gaze point information according to the eye feature information comprises:
    determining the gaze point information according to the eye feature information and the head posture information.

4. The method of claim 1, further comprising:
    acquiring environmental feature information,
    wherein in generating unlocking information according to the gaze point information comprises:
    generating unlocking information according to the gaze point information and the environmental feature information.

5. The method of claim 4, wherein the environmental feature information comprises at least one of sound information, magnetic field information, current information, temperature information, vibration information, and illumination intensity information.

6. The method of claim 5, wherein the environment feature information is configured as one of the user's sound information and the user's voiceprint information obtained through the user's sound information.

7. The method of claim 1, further comprising:
    presenting a reference object having at least one feature point, the gaze point information comprising feature point track information,
    wherein generating unlocking information according to the gaze point information comprises:
    generating unlocking information according to the feature point track information.

8. The method of claim 7, wherein a plurality of reference objects are provided, the plurality of reference objects are presented sequentially, and each reference object of the plurality of reference objects is presented after unlocking information obtained for a previous reference object matches the unlocking key.

9. The method of claim 8, wherein the plurality of reference objects comprise a first reference object, the method further comprises:

selecting the first reference object as a current reference object;

presenting the first reference object;

acquiring gaze point information of the user;

generating unlocking information according to the gaze point information;

performing a matching operation on the obtained unlocking information and a pre-stored unlocking key;

determining whether the matching operation is completed for all the plurality of reference objects when the matching operation is successful; and unlocking head-mounted display device when the matching operation is completed for all the plurality of reference objects.

10. The method of claim 7, wherein before presenting a reference object, the method further comprises a pre-calibration process, the pre-calibration process comprises:

presenting a calibration object;

prompting the user to gaze the calibration object near the calibration object;

obtaining gaze point information of the user when the user gazes the calibration object; and performing a calibration operation based on the acquired gaze point information and real information of the calibration object.

11. The method of claim 10, further comprising:

determining a coordinate difference based on acquired spatial coordinates of the gaze point and spatial coordinates of the calibration object, and calibrating subsequently acquired gaze point information by using the determined coordinate difference as a correction value.

12. The method of claim 7, wherein the reference object comprises a feature point for the user to select, and the reference object is one of a preset image, an image set, an object, and an object set for a user to perform unlocking processing.

13. The method of claim 1, wherein the unlocking key is preset by collecting gaze point information of the user.

14. A head-mounted display device, comprising:

at least one information collector configured to acquire eye feature information of a user who wears a locked head-mounted display device;

at least one processor, and a memory coupled to the at least one processor and configured to store a computer-executable instruction that, when executed, causes the at least one processor to perform:

determining the gaze point information according to the eye feature information;

generating unlocking information according to the gaze point information;

performing a matching operation on the unlocking information and a pre-stored unlocking key; and unlocking the head-mounted display when the unlocking information matches the unlocking key, wherein the at least one information collector is configured to:

acquire successive a plurality of frames of the user's facial images or the user's eye images, and extract eye feature points in each frame of the user's facial images or the user's eye images, wherein determining the gaze point information according to the eye feature information comprises:

determining gaze point track information according to changes in the eye feature points in the plurality of frames of the user's facial images or the user's eye images, wherein the gaze point information is configured as the gaze point track information.

15. The head-mounted display device of claim 14, wherein the head-mounted display device comprises augmented reality glasses.

16. The head-mounted display device of claim 14, wherein the computer-executable instruction that, when executed, causes the at least one processor to further perform:

presenting a reference object having at least one feature point, the gaze point information comprising feature point track information, wherein generating unlocking information according to the gaze point information comprises:

generating unlocking information according to the feature point track information.

17. The head-mounted display device of claim 16, wherein the reference object comprises one of a 3D virtual image presented in view field of the user and an object presented on a display of the head-mounted display device.

18. The head-mounted display device of claim 14, wherein the computer-executable instruction that, when executed, causes the at least one processor to further perform:

acquiring head posture information of the user through the at least one information collector, wherein determining the gaze point information according to the eye feature information comprises:

determining the gaze point information according to the eye feature information and the head posture information.

19. The head-mounted display device of claim 14, wherein the computer-executable instruction that, when executed, causes the at least one processor to further perform:

acquiring environmental feature information, wherein generating unlocking information according to the gaze point information comprises:

generating unlocking information according to the gaze point information and the environmental feature information.

20. A method for unlocking a head-mounted display device based on gaze point information, comprising:

presenting a reference object having at least one feature point, the reference object comprising one of a 3D virtual image presented in view field of a user who wears a locked head-mounted display device and an object presented on a display of the head-mounted display device;

acquiring gaze point information of the user, the gaze point information comprising one of a feature point, feature point track information, and a feature point set of the reference object that the user is gazing;

generating unlocking information according to the one of a feature point, feature point track information, and a feature point set of the reference object that the user is gazing;

performing a matching operation on the unlocking information and a pre-stored unlocking key; and unlocking the head-mounted display device when the unlocking information matches the unlocking key.

* * * * *